June 20, 1961  A. O. SCHMIDT  2,989,352
BEARING STRUCTURE
Original Filed Sept. 22, 1954

INVENTOR
Alfred O. Schmidt
BY
ATTORNEY

United States Patent Office 2,989,352
Patented June 20, 1961

2,989,352
BEARING STRUCTURE
Alfred O. Schmidt, Elm Grove, Wis., assignor to The Kearney & Trecker Corporation, West Allis, Wis., a corporation of Wisconsin
Continuation of application Ser. No. 457,612, Sept. 22, 1954. This application Sept. 11, 1958, Ser. No. 761,449
7 Claims. (Cl. 308—3)

This application is a continuation of my pending patent application, Serial No. 457,612, filed September 22, 1954, and now abandoned, for a Bearing Structure.

This invention relates generally to a bearing structure, and more particularly to an improved plastic bearing reinforced by particles of filler material.

Plastic slide bearings have been found to be particularly adaptable for use in machine construction for supporting movable members of the machine for sliding movement. In these machines, the movable member is provided with guideways disposed to cooperate with similar guideways formed on the supporting member. It has long been the practice to machine the guideways of both members to present metal bearing surfaces for metal to metal contact, with one metal bearing surface sliding along the other. More recently, it has been found that a superior structure may be obtained by providing a plastic bearing surface upon one of the guideways to replace one of the metal bearing surfaces and obtain a plastic to metal contact.

In order to obtain the necessary load bearing capacities and wear resistance qualities it has been found necessary to utilize a laminated plastic structure for this purpose, such as is produced by saturating sheets of fabric with a plastic, and placing them together in a pile which is cured under heat and pressure to form a plate. This type of bearing material is relatively expensive, and necessitates complex methods of mounting.

It is therefore a general object of the present invention to provide an improved plastic slide bearing.

Another object of the present invention is to provide an improved plastic slide bearing structure.

Another object is to provide an improved plastic slide bearing reinforced by particles of filler material embedded in the plastic in lieu of the laminated plastic structure.

Another object is to improve the load bearing capacity and wear resistance qualities of plastic slide bearings by the addition of particles of filler material.

Another object is to provide a slide bearing in which the load is supported by particles of filler material in a plastic binder.

Another object is to provide a bearing surface having a solid lubricating agent as an integral part thereof for permanent lubrication.

A further object is to provide an improved bearing structure of simple and inexpensive construction, but efficient in operation.

According to this invention the improved bearing structure comprises a layer of plastic having particles of filler material embedded in it mounted on a metal support. The improved structure is achieved by the particular arrangement of the particles of filler material in the plastic. The size of the individual particles of filler is such that they will occupy a depth equal to or greater than the thickness of the layer of plastic on the support. After the plastic layer has been applied to the metal support, it is machined to the desired thickness to form a smooth bearing surface, and in the process, portions of the filler particles will also be machined to present a smooth surface forming a part of the entire bearing surface. Since the filler particles have a depth equal to, or greater than the thickness of the layer of plastic, a good portion of them will rest directly upon the metal support, and will extend outwardly therefrom to the finished bearing surface. The bearing load will therefore be carried directly by these filler particles rather than the plastic material, and will be transmitted by them directly to the metal support. In addition to the filler material, particles of a solid lubricating agent, such as graphite or molybdenum disulfide are embedded in the plastic as a part of the layer on the metal support to provide permanent lubrication for the bearing surface.

The foregoing and other objects of this invention, which will become more fully apparent from the following detailed description, may be achieved by means of the exemplifying apparatus depicted in and set forth in this specification in connection with the accompanying drawings in which.

Figure 1:
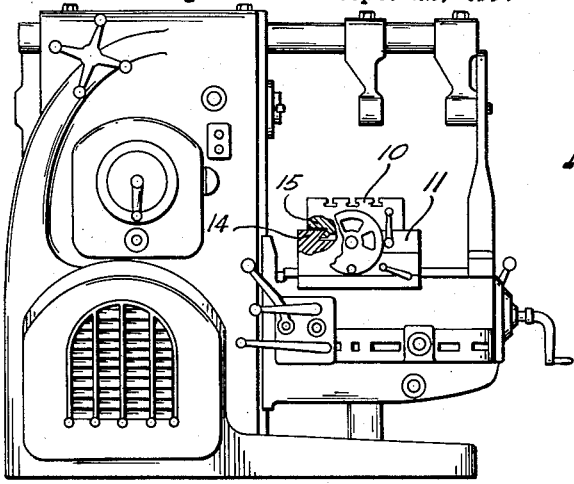
FIGURE 1 is a view in side elevation of a milling machine having guideways with slide bearings which may incorporate the bearing structure of the present invention.

Reference is now made more particularly to the drawings, and specifically to FIG. 1 thereof showing a knee type milling machine with members movable along slide bearings which may be fabricated in accordance with the teachings of the present invention. The improved bearing structure may be applied to any of the several sets of guideways incorporated in the machine, but will be here described in connection with the slide bearings provided to support a worktable 10 for sliding movement upon a saddle 11.

The saddle 11 includes guideways 14 formed integrally therewith in position to cooperate with similar guideways 15 formed on the underside of the table 10. It has long been the practice to machine the guideways 14 and 15 to form smooth bearing surfaces, with one of the bearing surfaces sliding upon the other, providing for metal to metal contact. More recently, an improved construction has been obtained by mounting a plastic plate on one of the guideways to form a plastic slide bearing for obtaining plastic to metal contact. The present invention relates to the particular structure of such plastic slide bearings.

The plastic slide bearing may be constructed in various forms, and several methods of mounting the plastic plate on the guideway may be utilized, the particular bearing structure of the present invention being applicable to any of such various constructions. However, it is shown here incorporated in the plastic slide bearing construction comprising a continuous layer of plastic secured to the guideways by its inherent adhesive properties.

Such plastic slide bearing is fabricated of a thermosetting plastic having inherent adhesive properties. The plastic may be prepared by combining a liquid polymer such as a mercaptan-terminated liquid polysulfide polymer with an epoxy resin to form a mastic or pasty substance. To this mixture, particles of filler material 16 are added to reinforce the plastic. The particular arrangement of the particles of filler material forms a part of the present invention and will be subsequently described in greater detail. The filler material obviates the necessity of utilizing a laminated plastic structure for this purpose, while at the same time it provides greater load bearing capacities, better sliding surfaces, and improved wear resistance qualities. In addition to the filler material, particles of a solid lubricating agent, such as graphite or molybdenum disulfide may be included in the plastic mixture to become an integral part of the slide bearing for permanent lubrication. Such lubrication will be sufficient for normal applications, but may be supplemented with conventional lubricating means under severe operating conditions for maximum efficiency.

Figure 2:
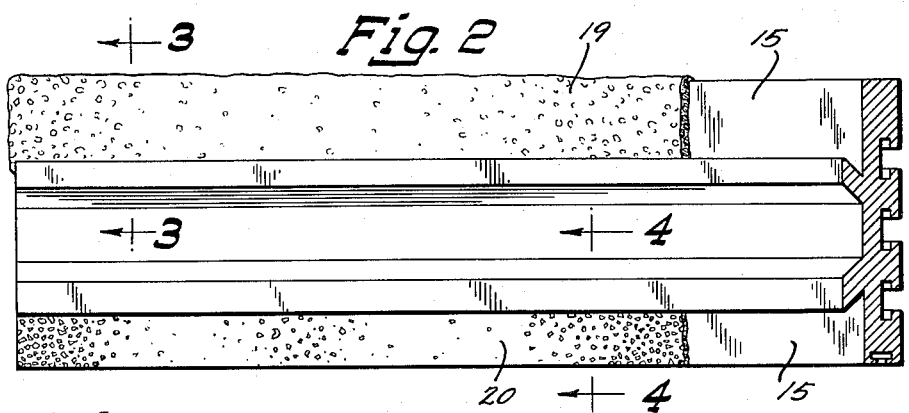
FIG. 2 is a fragmentary bottom view of the table of the milling machine illustrated in FIG. 1, depicting its guideways, with one of the guideways being coated with the bearing material which is shown before machining, and the other guideway showing the bearing material machined to present a bearing surface.
Figure 3:
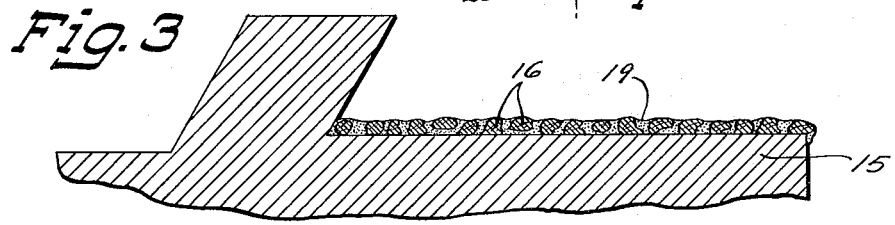
FIG. 3 is a fragmentary view in vertical section taken along the plane represented by the line 3—3 in FIG. 2, illustrating the bearing material on the guideway before it has been machined, and, FIG. 4 is a fragmentary view in vertical section taken along the plane represented by the line 4—4 in FIG. 2, illustrating the plastic plate on the guideway after it has been machined.

The mixture thus obtained is applied to the guideways 15 to place a continuous layer of plastic 19 upon the guideways 15, as illustrated on the upper guideway 15 in FIG. 2, and in section in FIG. 3. Although the plastic will set at room temperature, it is preferable to apply heat to elevate the temperature of the mixture to approximately 220° F. The heat not only accelerates the setting of the plastic but also has a curing effect serving to improve its physical properties. The plastic will adhere to the guideways 15 by virtue of its inherent adhesive properties, and no other means are required to secure it in position.

Figure 4:
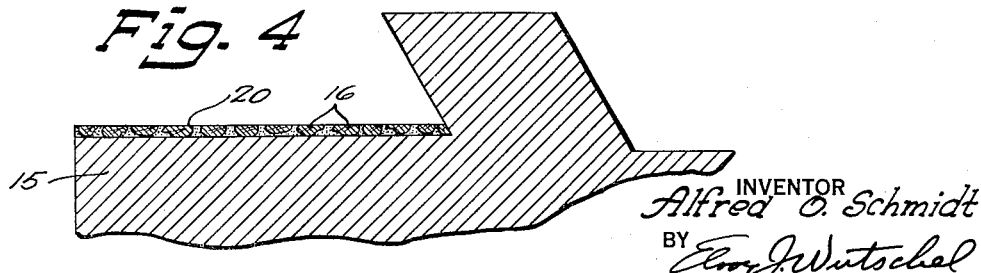

After the plastic has thoroughly hardened, it is machined to a thickness usually not exceeding approximately one-sixteenth of an inch to form a smooth bearing surface 20, depicted on the lower guideway 15 in FIG. 2 and in vertical section in FIG. 4. In the present embodiment, the plastic bearing surface 20 is applied to the guideways 15 of the table 10 so that it slides along a metal bearing surface formed on the guideways 14 of the saddle 11. It is to be understood, however, that the plastic slide bearings could also be applied to the guideways 14 of the saddle 11 for cooperation with metal bearing surfaces on the guideways 15 of the table 10 so that the metal bearing surface would slide along the plastic bearing surface without detracting from the construction.

It is obvious that in many machine structures the slide bearings are subjected to heavy loading and severe operating conditions. One of the purposes of the present invention therefore, is to increase the load bearing capacity and wear resistance qualities of plastic slide bearings for machine applications without sacrificing any of the advantages of plastic slide bearing construction. This is achieved by selecting the size of the particles of filler material 16 added to the plastic, with the particles being formed of hardwood, nylon or other similar material having substantial compressive strength and good bearing properties.

As previously mentioned, the thickness of the plastic plate is usually limited to approximately one-sixteenth of an inch to prevent its distortion by reason of temperature changes, since the coefficient of expansion of the plastic plate is different than the coefficient of expansion of the metal of the guideways 15 which support it. If the plastic on the guideways 15 does not exceed approximately one-sixteenth of an inch, it will possess sufficient elasticity to flow with the dimensional changes due to temperature effects in the guideways 15, so that it will not distort even though it is a continuous plate secured to the guideways 15 by its own adhesive properties. The thickness of the plastic plate may be reduced to less than one-sixteenth of an inch, and it has been found that a plastic slide bearing of this kind only 0.010 of an inch in thickness will perform very satisfactorily.

In carrying out the teachings of the present invention, the thickness of the plastic plate determines the size of the particles of filler material 16 that are to be added to the plastic, with the smallest diameter of the particles of filler material being equal to or greater than the thickness of the plastic plate. Thus, assuming that the thickness of the plastic plate is established as .030 of an inch, the particles of filler material 16 will be selected so that all, or at least a great majority of them, will have a smallest diameter measuring a minimum of .030 of an inch, and preferably not exceeding .040 of an inch for maximum efficiency. Thus, in practice, they would be selected by screening, utilizing those particles which would pass through a .040 of an inch mesh, but would not pass through a .030 of an inch mesh.

With the size of the particles of filler material 16 thus controlled, as the mastic is applied to the guideways 15, a large proportion of the particles 16 will rest upon the metal surface of the guideways 15, and extend upwardly therefrom at least .030 of an inch which is the final thickness of the plastic plate. The particles 16 are shown in FIG. 3, arranged in this manner on the guideway 15 before the plastic slide bearing has been machined, the plastic plate and particles 16 being there shown exaggerated for the purpose of clarity.

When the layer of plastic 19 is machined to the .030 of an inch thickness to form the bearing surface 20, the portions of the particles of filler material extending more than .030 of an inch above the guideways 15 will also be severed, to present a flat surface forming a part of the bearing surface 20 as illustrated in FIG. 4. Thus, the bearing surface 20 is formed partially of the plastic and partially of the flat surfaces presented by the particles of filler material 16, all blended together to form one uniformly flat bearing surface to serve as a slide bearing.

Furthermore, since the particles of filler material 16 will have a minimum small diameter of .030 of an inch, which is also the thickness of the plastic plate, a large proportion of the particles of filler material 16 will not only form a part of the bearing surface 20, but will also extend downwardly therefrom to the guideways 15 so that they occupy the entire depth of the plastic plate to rest upon the guideways 15. These particles of filler material 16 therefore, will carry the bearing load and transmit it directly to the guideways 15.

Due to its greater elasticity, the plastic material itself will carry none or very little of the bearing load, and will serve primarily as a binder for holding the particles of filler material 16 to form a heterogeneous bearing material. Thus, the plastic portion of the bearing is relieved of the bearing load which is carried by the particles of filler material 16 having superior load carrying capacity. In this manner the load carrying capacity of the slide bearing is increased substantially without sacrificing any of the advantages of plastic slide bearings for machine guideways.

From the foregoing detailed description of illustrative apparatus constituting an exemplifying embodiment of the present invention, it will be apparent that there has been provided an improved plastic bearing structure in which the load carrying capacity of the bearing has been increased without sacrificing any of the advantages of plastic bearings.

Although the illustrative embodiment of the invention herein set forth has been described in detail to make a full disclosure of the invention, it is to be understood that the particular apparatus described is intended to be illustrative only, and that the various features of the invention may be incorporated in other forms without departing from the spirit and scope of the invention as defined in the subjoined claims.

The principles of this invention having now been fully explained in connection with the foregoing description, I hereby claim as my invention:

1. In a bearing structure mounted on a supporting surface, a layer of plastic on said supporting surface, said plastic presenting a smooth bearing surface, and granular particles of filler material embedded in said plastic so that each of the particles rests upon said supporting surface and extends outwardly therefrom through the thickness of said plastic plate to form a part of said bearing surface, whereby said plastic serves as a binder for holding said particles of filler material in position to carry the bearing load and transmit it to the supporting surface.

2. In a bearing structure mounted on a supporting surface, a layer of plastic on said supporting surface, said plastic presenting a smooth bearing surface, and granular particles of filler material embedded in said plastic, each of said particles of filler material occupying a depth equal to the thickness of said layer of plastic, whereby said plastic serves as a binder for holding said particles of filler material in position to carry the bearing load and transmit it to the supporting surface.

3. In a slide bearing for the guideway of a machine, a plastic plate on said guideway presenting a smooth bearing surface, and granular particles of filler material embedded in said plastic, each of the particles being in contact with said guideway and extending outwardly therefrom to the surface of said plastic plate to present a smooth surface forming a part of said bearing surface for carrying the bearing load, whereby said plastic serves as a binder for holding said granular particles in position to carry the bearing load and transmit it to said guideways.

4. In a slide bearing for a guideway of a machine, a plastic plate on said guideway presenting a smooth bearing surface, and granular particles of filler material embedded in said plastic each of said granular particles being in position so that said particles carry the bearing load and transmit it directly from said bearing surface to said guideway with the plastic serving as a binder for holding said granular particles in position.

5. In a slide bearing for a guideway of a machine, a plastic plate on said guideway presenting a smooth bearing surface, and granular particles of hardwood embedded in said plastic, each of said particles being of sufficient size to rest upon said guideway and extend outwardly therefrom through the thickness of said plastic plate to form a part of said bearing surface, whereby said plastic serves as a binder for holding said granular particles in position to carry the bearing load and transmit it to said guideway.

6. In a bearing structure mounted on a supporting surface, a layer of plastic on said supporting surface, said plastic presenting a smooth bearing surface, particles of filler material embedded in said plastic, each of said particles of filler material resting upon said supporting surface and extending outwardly therefrom through the thickness of said plastic plate to form a part of said bearing surface, and particles of a solid lubricating agent embedded in said plastic to form a part of the bearing surface and thereby provide permanent lubrication to said bearing surface, whereby said plastic serves as a binder for retaining said particles of lubricating agent and for holding said particles of filler material in position to carry the bearing load and transmit it to the supporting surface.

7. In a slide bearing for a guideway of a machine; a plastic plate secured to the guideway by its inherent adhesive properties, said plastic plate presenting a smooth bearing surface, and granular particles of filler material embedded in said plastic in position to carry the bearing load so that the load on the bearing is transmitted directly to the guideway through said granular particles of filler material with the plastic serving as a binder for holding said particles of filler material in position and to form a smooth uninterrupted bearing surface.

References Cited in the file of this patent

UNITED STATES PATENTS

| | | |
|---|---|---|
| 445,989 | Friend | Feb. 10, 1891 |
| 1,276,614 | Beusch | Aug. 20, 1918 |
| 2,581,301 | Saywell | Jan. 1, 1952 |
| 2,695,425 | Stott | Nov. 30, 1954 |

FOREIGN PATENTS

| | | |
|---|---|---|
| 385,425 | Great Britain | Dec. 29, 1932 |